United States Patent [19]

Zellner et al.

[11] 4,217,039
[45] Aug. 12, 1980

[54] MICROFICHE VIEWER WITH ROTATABLE BASE

[75] Inventors: John R. Zellner, Hartford; Eino M. Lehto, Juneau; Michael V. Polinsky, Iron Ridge, all of Wis.

[73] Assignee: Bell & Howell Company, Chicago, Ill.

[21] Appl. No.: 951,692

[22] Filed: Oct. 16, 1978

[51] Int. Cl.[2] ............................................. G03B 23/08
[52] U.S. Cl. .................................... 353/27 R; 353/77; 353/119; 353/85
[58] Field of Search .................... 353/119, 122, 74–78, 353/27 R, 27 A, 52, 87, 85, 25; 352/202, 143; 248/11; 355/30

[56] References Cited

U.S. PATENT DOCUMENTS

| 1,590,896 | 6/1926 | Linstadt | 314/89 X |
| 2,837,965 | 6/1958 | Goldsmith | 353/52 |
| 3,120,783 | 2/1964 | Swing et al. | 353/78 |
| 3,320,854 | 5/1967 | Wally | 353/27 R |
| 3,733,121 | 5/1973 | Smitzer | 353/27 R |
| 3,756,709 | 9/1973 | Lettan | 353/27 R |
| 3,826,579 | 7/1974 | Schurgin | 353/12 X |
| 3,973,344 | 8/1976 | Frankel | 353/120 X |
| 3,985,430 | 10/1976 | Steiner | 353/77 |

Primary Examiner—Harry N. Haroian
Attorney, Agent, or Firm—Alan B. Samlan

[57] ABSTRACT

A microfiche viewer with a light projection path whereby different images on an individual piece of microfilm can be placed in the light projection path for viewing. The fiche is rectangular in configuration and is inserted into the viewer with the shorter side parallel to the front of the viewer. A rotatable base is attached to the bottom of the viewer which is designed to limit the angular rotation of the microfiche viewer.

5 Claims, 7 Drawing Figures

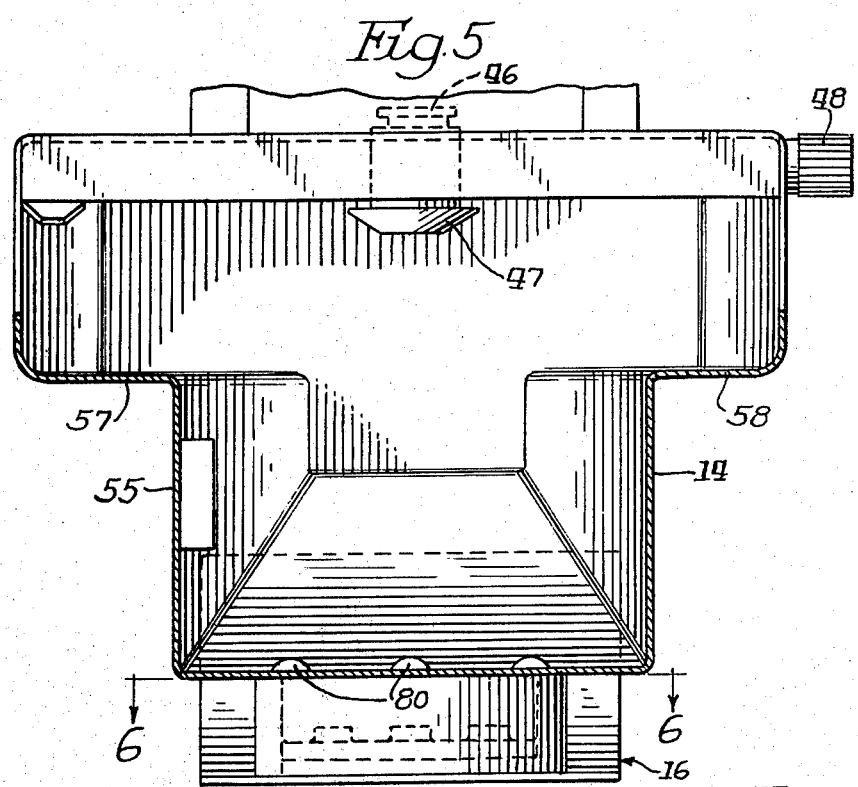
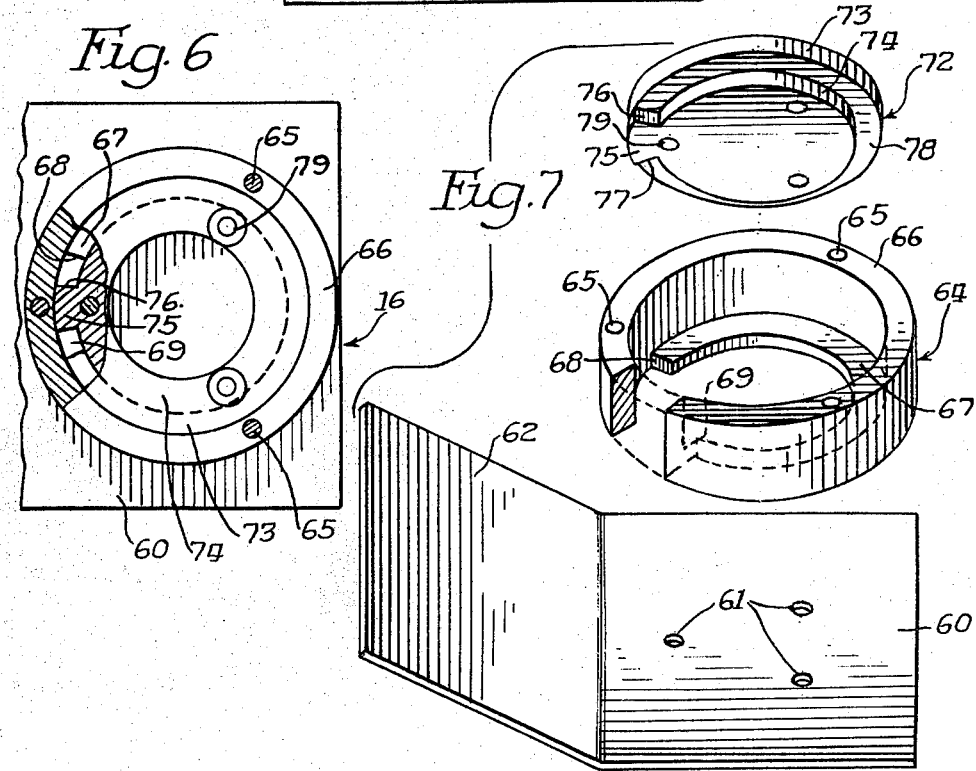

MICROFICHE VIEWER WITH ROTATABLE BASE

BACKGROUND OF THE INVENTION

This invention relates to microfiche viewers, and more particularly to a microfiche viewer designed to have a narrow front profile and a rotatable base attached to the bottom portion of the viewer.

Microfiche film is a known form of graphic data presentation wherein a number of images are photographically reproduced on a single piece of film or microfiche. Such cards are generally rectangular in configuration and approximately four inches by six inches. The number of images placed on a single piece of microfiche depends upon the reduction ratio of the images when they are filmed. Generally, the images are placed in an orthogonal array on the film in such a manner that when the film is placed in the microfiche viewer, the longer side of the card is parallel to the front of the viewer. Thus, when the documents are filmed they are filmed in such a manner that the information on the document will be projected in a readable position on the viewing screen when the fiche is placed in the viewer in this mode. This orthogonal configuration generally results in many more columns across the fiche than rows along the side of the fiche resulting in a wider microfiche carrier to hold the microfiche. This is a problem when the microfiche viewer must be placed in a narrow space or when desk top area is at a premium. If a narrower viewer was used, additional work space would be available for the user of the equipment.

The microfiche is manipulated by placing it between a pair of glass flats which are moveable in the X and Y directions. The microfiche is placed in the projection path of the lamp and lens arrangement whereby an individual image is projected on the screen.

With the increased usage of microfilm viewers, especially in office environments, it is often desirable to have one viewer which can be rotated on its base for use by two or more operators. Thus, when one operator has finished using the device, the adjacent operator can then rotate the unit so that the screen is perpendicular to the second user for maximum readability of the projected image.

In the past, turntables have been made available upon which the microfilm viewer could be placed, but these turntables were designed to accept numerous varieties of equipment and not designed for one specific viewer. This resulted in a large desk top area beng consumed by the turntable.

Accordingly, it is an object of the present invention to provide a microfiche viewer designed to accept rectangular microfiche with the shorter sides parallel to the front of the viewer, whereby a narrower microfiche viewer can be made.

Another object is to provide a microfiche viewer having a rotatable base attached to the bottom of the viewer which will restrict the angular rotation of the microfiche viewer to a predetermined angle. It is also an object to have the rotatable base not take any more additional desk top area than the viewer itself would occupy.

These and other objects of the invention are accomplished by providing a microfiche viewer that employs a fiche carrier designed to accept rectangular microfiche having the shorter side parallel to the user. A rotatable base is further added to the bottom of the viewer with detents in the base portion whereby the angular rotation of the microfiche viewer is restricted.

SUMMARY OF THE INVENTION

The present invention provides a microfiche viewer having a narrow front profile and a rotatable base such that the viewer can be angularly rotated within a predetermined angle.

The fiche carrier is designed such that it has rectangular glass flats arranged in a manner with the short sides of the glass flats parallel to the viewer and the long sides parallel to the sides of the microfiche device. The microfiche has the images placed on the film such that the documents which were filmed have the top of the documents parallel to the short sides of the microfiche. Thus, when the microfiche is inserted into the carrier, the image projected will be properly oriented on the screen.

A rotatable base is connected to the bottom of the microfiche viewer and designed to limit the angular rotation of the viewer. The rotatable base has a base plate on which is mounted a circular disc. A mating sleeve portion is mounted to the bottom of the microfilm viewer and closely receives the rotatable disc within the sleeve. There are detents within the sleeve whereby rotation of the disc is restrained, thereby restraining the angular rotation of the viewer attached thereto.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 5 is a front view of the lower compartment of the microfilm viewer of FIG. 4 with the components and component drawer removed.

FIG. 6 is a cross sectional view taken along line 6—6 of FIG. 5 with portions removed.

FIG. 7 is an exploded view of the rotatable base portion.

DESCRIPTION OF THE PREFERRED EMBODIMENT

Figure 1:
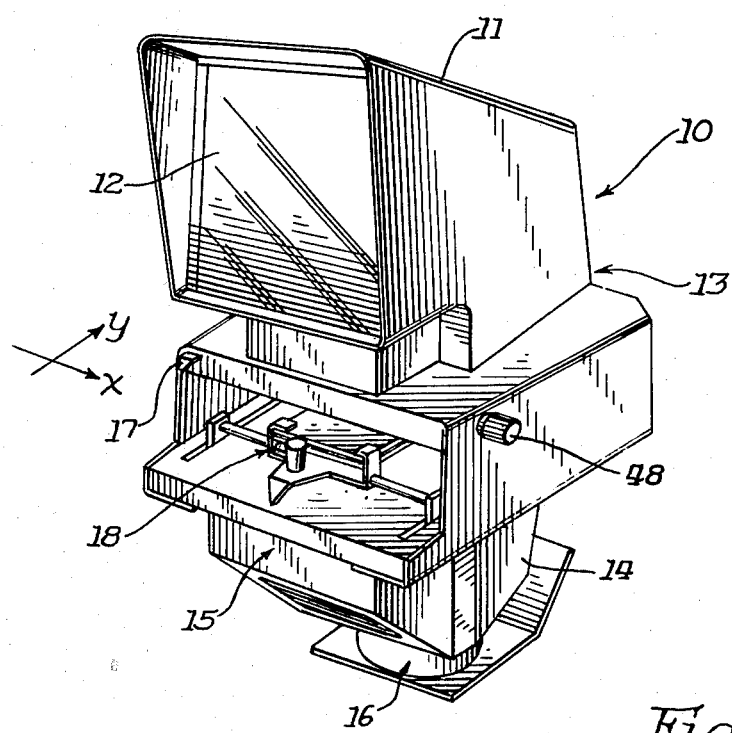
FIG. 1 is a perspective view of a microfiche reader illustrating the fiche carrier and rotatable base.

Turning first to FIG. 1, there is illustrated a microfiche viewer 10 illustrating our invention. The viewer has an upper compartment 13 having a hood 11 and screen 12. A lower compartment 14 has a removable drawer 15 which contains the power components. A fiche carriage 18 is positioned between the upper and lower compartments and can be moved in the horizontal X and Y directions. Mounted at a front portion of the upper compartment is a fiche position indicator 17 which gives a visual indication as to the location of the fiche carriage during operation.

For some applications, it is desirable to have the microfiche viewer 10 to be made as narrow as possible. In order to accomplish this, the present viewer is designed to receive rectangular microfiche 21 with the shorter sides of the fiche substantially parallel to the front of the viewer 10.

Figure 2:
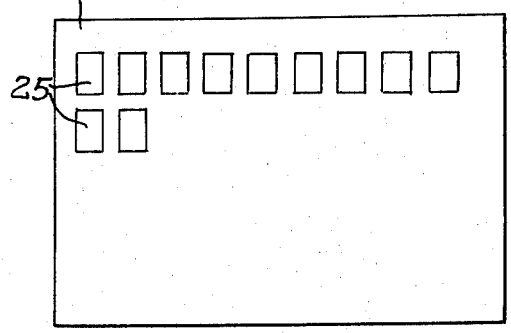
FIG. 2 is a top view of a microfiche commonly known in the prior art wherein the top of the document images are parallel to the long sides of the microfiche.
Figure 3:
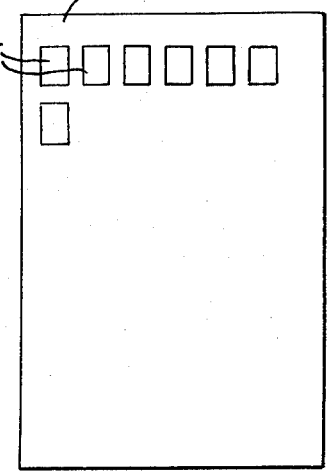
FIG. 3 is a top view of a piece of microfiche wherein the documents are filmed with the top edges of the documents parallel to the short sides of the microfiche.

FIG. 2 illustrates the standard method of placing documents 25 on microfiche 21. It can be seen that the longer side of the microfiche is parallel to the top of the documents. Thus, if microfiche as illustrated in FIG. 2 were to be utilized, the width of the fiche carriage 18 would necessarily have to be wide enough to accept the individual piece of microfiche. However, if the documents were placed on the microfiche 21a as shown in FIG. 3, the width of the fiche carriage 18 could be reduced as compared to a fiche carriage adapted for use with the fiche shown in FIG. 2. The documents in FIG. 3 have their shorter sides parallel to the shorter sides of the microfiche. What is essential, is that when the document is placed on the microfiche, it must be oriented so that the microfiche can be inserted into the viewer with the shorter side parallel to the front of the viewer. By orienting the documents on the fiche in this manner, a narrower fiche carriage 18 can be utilized which results in a narrower microfiche viewer 10.

Figure 4:
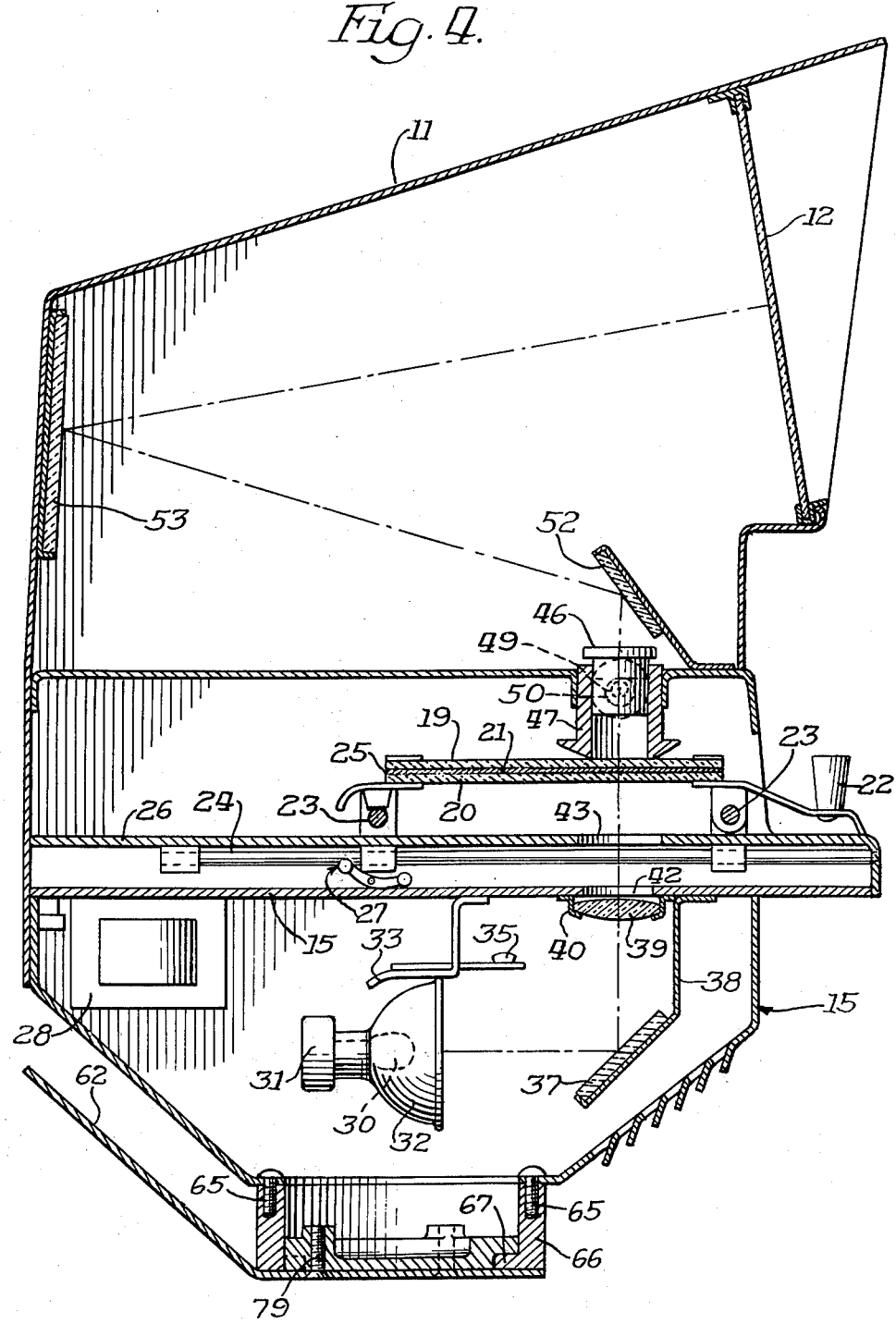
FIG. 4 is a side view of the microfiche reader of FIG. 1 in cross section.

FIG. 4 clearly illustrates the operations of the microviewer. The microfiche 21 is placed between upper glass flat 19 and lower glass flat 20. The fiche carriage 18 is manipulated by means of carriage handle 22 which is grasped by the user. The fiche carriage 18 is then moved in the orthogonal directions on carriage guide rods 23 and 24.

Power is provided to the microfiche viewer through a standard electrical cord which is connected to a suitable power source (not illustrated). Voltage from the power source is generally stepped down by means of a transformer 28 mounted at the rear of the removable drawer 15 which supplies power to a lamp socket 31 and its associated lamp 30 disposed forwardly of the transformer. A reflector 32 partially enclosing closing the lamp 30 concentrates the light beam upon mirror 37 mounted forward of the lamp 30. The lamp 30 and associated reflector 32 are generally supported from a lamp support bracket 33 between the top of the removable drawer 15 and the reflector 32. A thermal temperature sensor 35 can also be mounted near the lamp 30, as on the bracket 33, to sense unsafe temperature conditions. The sensor 35 would be connected to the power circuit. When the temperature exceeds a preset limit, the temperature sensor 35 opens a switch which de-energizes the power circuit, thereby turning the lamp 30 off.

An electrical switch 27 is placed in the carriage slide path such that as the carriage is pulled towards the front of the viewer, and the fiche is in the light projection path, the electrical switch is turned to its "on" position. This completes the electrical circuit to the lamp 30. When the carriage is pushed to its rearmost position, the switch 27 is turned to its "off" position by means of the carriage sliding forward along carriage guide rod 24. Thus, the lamp 30 is de-energized.

The mirror 37 is mounted on a mirror bracket 38 which extends downwardly from an upper front portion of the drawer 15 and reflects light from the lamp 30 up through condensor lens 39 which is supported by a lens mounting support 40 which is mounted to the top of drawer 15.

The light path then proceeds through an opening 42 in the top of the removable drawer and through a second opening 43 in a carriage support plate 26. The light passes through the glass flats and microfiche and through projection lens 46. The projection lens 46 is supported by a cone 47 which rests upon the upper glass flat 19. A focusing knob 48 (FIG. 1) has at the end of its shaft an eccentric pin 49 which rotates within a circular focusing recess 50. By this means, the projection lens 46 can be moved up or down relative to the microfiche thereby focusing the image.

The length of the optical path is then increased by reflecting it off of a mirror 52 onto another mirror 53 located on the back of housing 11. The image is then reflected onto the screen 12 for viewing. The removable drawer 15 is designed with a male electrical connector (not illustrated) which makes contact with a female electrical connector 55 as illustrated in FIG. 5. Thus, as the drawer 15 is inserted into the lower compartment 14 an electrical connection is made between the connectors. The female connector 55 is generally connected to the external power source and the male connector to the transformer 28. The drawer 15 is designed to be easily inserted along lower compartment guide rails 57 and 58.

The operation of the rotatable base is most clearly shown in FIGS. 5-7. The rotatable base actually is comprised of a base plate 60, a sleeve 64, and a disc 72.

The base plate 60 has mounting holes 61 and an angular back portion 62. (FIG. 7)

The sleeve 64 has an outer wall 66 with mounting holes 65 therein. Inside the outer wall 66 and at the bottom portion thereof, there is an annular shelf 67 with detents or stops 68, 69.

The disc 72 has an upper disc portion 73 and a smaller diameter lower disc portion 74 on the underside of the upper disc. There is a tab 75 protruding out from a portion of the lower disc, the tab terminating in tab sides 76, 77. An annular ledge 78 joins the upper disc 73 and lower disc 74. The width of ledge 78 is substantially the same as the width of shelf 67. Also, the surfaces of ledge 78 and shelf 67 are smooth so that the surfaces will allow disc 72 to easily slide over shelf 67 after the rotatable base is assembled.

Both disc 72 and sleeve 64 are circular in design, with the outer diameter of disc 72 dimensioned to be closely received by the inside portion of the outer wall 66 on sleeve 64.

The vertical thickness of the lower disc portion 74 is less than the vertical thickness of the shelf 67. Furthermore, the diameter of disc portion 74 is dimensioned to be closely received within the inner diameter of shelf 67, but without frictional engagement with the shelf 67. Therefore, when the disc 72 is placed within the sleeve 64, it is allowed to rotate freely. However, the angular rotation of the disc 72 is restrained by tab sides 76 and 77 coming into contact with detents 69 and 68 respectively. The amount of angular rotation can be predetermined by the width of tab 75 and the distance between detents 68 and 69.

During assembly, disc 72 is first placed within sleeve 64. Then, in order to securely lock all portions of the rotatable base together, mounting screws 80 are passed through the bottom portion of the lower compartment 14 (FIG. 5). These screws are aligned with mounting holes 65 in the sleeve 64 to securely hold sleeve 64 to the lower compartment. Disc 72 has mounting holes 79 which are aligned with the holes 61 in the base plate 60. Similar screws or fasteners are inserted through the bottom of the base plate 60 and into the mounting holes 79 to securely hold the disc 72 to the base plate. This second assembly step must be done after the disc 72 is placed within the circular sleeve 64. This results in disc 72 being firmly attached to the base plate 60 while it is rotatably received within the sleeve 64 which is firmly attached to the lower compartment 14. Thus, the microfiche viewer 10, can be rotated by means of the rotatable movement of the sleeve 64 with respect to the disc 72.

It will be readily apparent to those skilled in the art to perceive how to modify this apparatus. Therefore, the appended claims are to be construed to cover all equivalent structures.

We claim:

1. A microfiche viewer comprising:
    an upper compartment having a hood with base, front, side and rear portions,
    a projection screen mounted adjacent to the front portion,
    a first mirror mounted adjacent to the rear portion,
    a projection lens and second mirror mounted at the base portion,
    a lower compartment with a removable drawer having a light source and means to project a beam of light from the light source to the projection lens and second mirror,
    top and bottom glass flats to retain an image bearing piece of microfilm therebetween, said glass flats interposed between the second mirror mounted in the upper compartment and the third mirror mounted in the lower compartment,
    a slide carrier retaining the glass flats such that the top glass flat can be raised for insertion and removal of the microfilm, the slide carrier being movable in a horizontal plane,
    the glass flats having a rectangular configuration with one pair of opposite sides of the glass flats longer than the other pair of opposite sides with the shorter sides substantially parallel to the front portion of the microfiche viewer and the longer sides substantially parallel to the side portions of the viewer,
    a rotatable base attached to the bottom of the lower compartment comprising a base plate, a circular disk mounted to the base plate, a circular sleeve mounted to the bottom of the lower compartment and closely receiving the circular disk mounted to the base plate within the sleeve for rotatable movement with respect thereto, a tab on the rotatable disk, and multiple detents within the sleeve whereby the angular rotation of the disk is restrained to a predetermined angle by the tab contacting the detents,
    the lamp, lenses, mirrors, and screen defining a light projection path such that different images on the microfilm can be placed in the light projection path as the slide carrier is moved in a horizontal plane, whereby individual images on microfiche may be individually displayed by movements of the slide carrier and the images on the microfiche are placed in an orthogonal orientation such that the longer sides of the rectangular fiche are aligned with the longer sides of the glass flats.

2. A microfiche viewer as in claim 1 and further comprising heat sensing means to de-energize the projection lamp when the temperature in the lower compartment rises above a predetermined temperature.

3. The microfiche viewer in claim 1 and further comprising an electrical switch which is operated by movement of the slide carriage such that the projection lamp is energized when the slide carriage is moved into an operational viewing position with the microfilm in the light projection path and de-energized when the carriage is moved into a non-operational position and the microfilm is moved out of the light projection path.

4. The microfiche viewer as in claim 1 wherein the circular disc is comprised of an upper disc portion and a lower disc portion connected by an annular ledge, and the circular sleeve is comprised of an outer wall portion and an annular shelf, the width of the annular ledge substantially the same as the width of the annular shelf, whereby the annular ledge is supported by the annular shelf for rotatable movement with respect thereto.

5. The microfiche viewer as in claim 1 wherein the means to project the beam of light comprises a projection lamp, reflector, a third mirror, and a condensor lens.

* * * * *